United States Patent Office 2,806,500
Patented Sept. 17, 1957

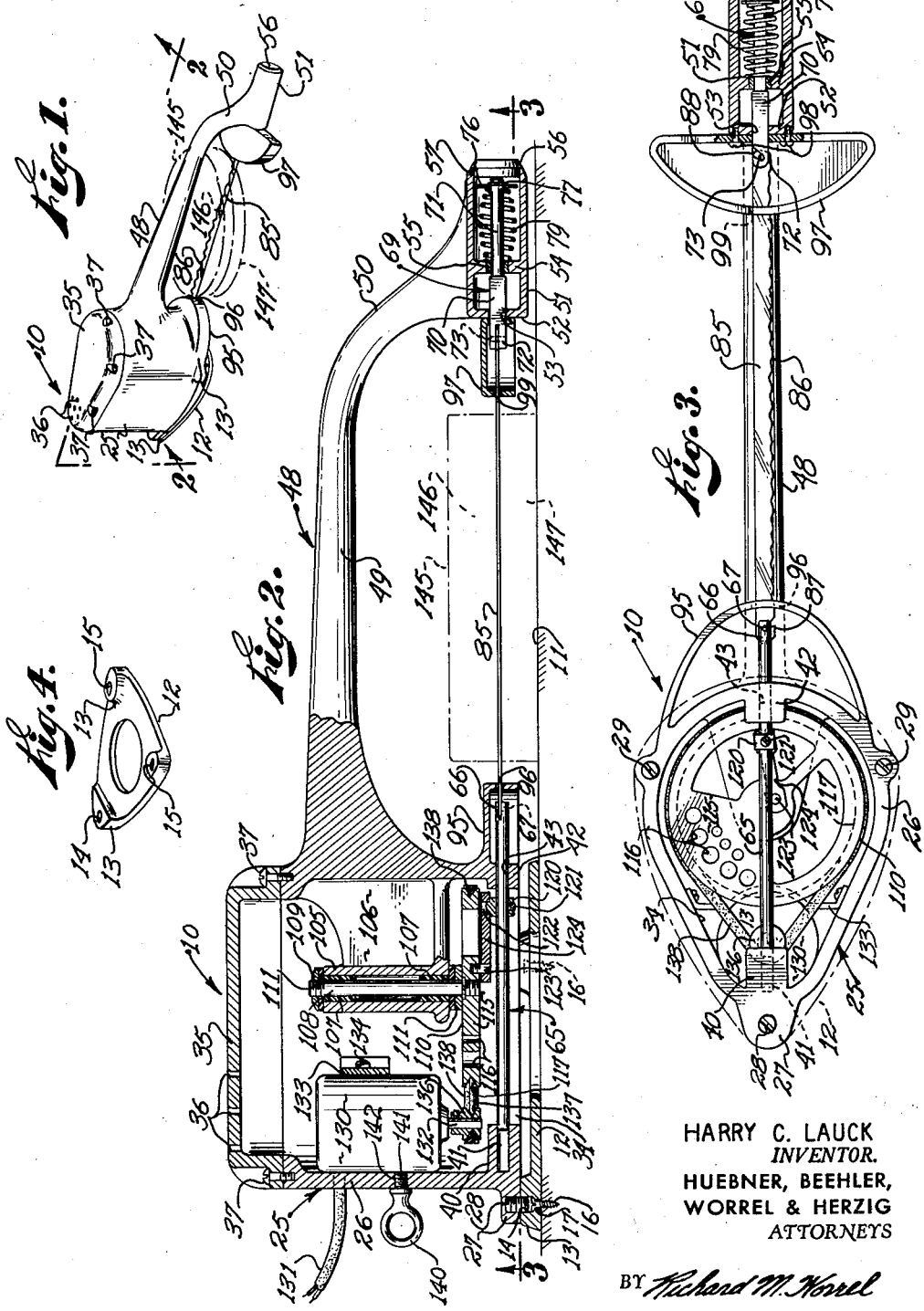

2,806,500

SLICING MACHINE

Harry C. Lauck, Fresno, Calif.

Application July 16, 1956, Serial No. 597,981

5 Claims. (Cl. 146—151)

The present invention relates to a material cutting machine and more particularly to a machine for slicing pastry articles.

The subject invention was developed to overcome certain problems in the bakery art and thus, is conveniently described in such an environment. As will be seen, however, it has more general application where similar problems are involved. In the wholesale making of cakes in modern bakeries, it has been the practice to bake relatively tall or long pieces of cake and thereafter to slice them into a plurality of layers of desired height. Each layer constitutes a cake of predetermined shape and size which is subsequently distributed to retail bakeries for sale to consumers.

In the past it has been quite common to perform this slicing operation by hand. However, manual slicing has not been satisfactory because of the hazard of accident, the high cost of labor, and because of the irregularity and non-uniformity in size and shape of the cakes sliced.

Machines have been devised for accomplishing this slicing operation but they have generally been relatively expensive to procure; and extremely large and bulky so as to be difficult to move and requiring considerable floor space when installed.

Accordingly, it is an object of the present invention to provide an improved slicing machine especially suited for slicing pastry articles, such as cake.

Another object is to provide a portable cake slicing machine.

Another object is to provide a cake slicer which is relatively inexpensive to make and use.

Another object is to provide a cake slicing machine for slicing cakes into layers of uniform size and shape.

Another object is to eliminate the hazards and expense involved in the manual slicing of cakes.

Another object is to provide a cake slicing machine which is relatively compact and one which requires relatively little floor or bench space.

Other objects are to provide a machine of the nature described which is durable in construction, dependable in operation, adapted to a wide variety of articles to be sliced, and which is highly effective for accomplishing its intended purposes.

These and other objects will become apparent upon reference to the following description.

In the drawing:

Fig. 1 is a perspective view of a slicing machine constructed in accordance with the present invention and also showing a cake in dot-dash lines in a position being sliced by the machine.

Fig. 2 is a somewhat enlarged, vertical section taken on line 2—2 of Fig. 1, also showing a cake in dot-dash lines, and showing a table on which the machine and cake are supported.

Fig. 3 is a horizontal section taken on line 3—3 of Fig. 2.

Fig. 4 is a perspective view of a base member employed with the invention.

Referring more particularly to the accompanying drawing, the slicing machine of the present invention is generally indicated by the numeral 10 and is mounted on a supporting table 11 having a substantially horizontal upper surface. The slicing machine includes a base 12 having three upwardly extended bosses 13 providing a vertically disposed apex socket 14 and vertically disposed base sockets 15. The bosses and thus the sockets are arranged in substantially isosceles triangular relation. Screws 16 are fitted downwardly into the sockets and screw-threadably projected into the table for securing the base on the table with the sockets upwardly disposed. It is to be noted that the sockets provide necks 17 engageable with the heads of the screws to enable the base to be held down by the screws.

The slicing machine 10 has a hollow housing 25 providing an upstanding side wall 26 circumscribing an internal space within the housing. Flanges 27 are extended outwardly from the side wall, and a plurality of studs 28 and 29 are screw-threadably fitted in the flanges so as to extend downwardly from the housing. The studs, as best seen in Fig. 3, are also arranged in substantially isosceles triangular relation in the same manner as the sockets 14 and 15 thereby also providing an apex stud and a pair of base studs. The studs are frictionally fitted in the corresponding sockets so as to mount the housing on the base 12.

The housing 25 has a downwardly disposed lower opening 34 in adjacent spaced relation to the base 12, and an upper cover 35 including air vents 36 is secured to the side wall 26 by bolts 37. The housing also has a sleeve portion 40 providing a bore 41, and a diametrically opposed sleeve portion 42 providing a bore 43 axially aligned with the bore 41. The bores 41 and 43 have axes which lie in a substantially vertical plane containing the apex socket 14 and being substantially equidistantly spaced between the base sockets 15.

A substantially L-shaped cantilever arm 48 provides an upper horizontal portion 49 rigidly connected to the housing 25 between the base studs 29 and extended outwardly therefrom in spaced relation above the table 11. The arm also has a portion 50 extended downwardly from the upper portion 49, and a tubular portion 51 integrally connected to the portion 50 and being substantially axially aligned with the bores 41 and 43. It is to be noted that the cantilever arm lies in said vertical plane containing the apex socket 14 and being intermediate the base sockets 15. The tubular portion has a fixed end plate 52 providing a rectangular opening 53, a central partition 54 in which is fitted a bearing 55, and a closure member 56 releasably held in position by a setscrew 57.

An elongated substantially cylindrical blade-attaching rod is slidably fitted in the bores 41 and 43 and has a bifurcated end 66 outwardly extended from the housing 25. A vertically disposed pin 67 is mounted in the outer end of the rod for a purpose to be described. A blade-attaching rod 69 provides an outer portion 70 of rectangular cross section non-rotatably, longitudinally slidably extended through the rectangular opening 53 of the tubular portion 51 and a cylindrical inner portion 71 slidably fitted in the bearing 55. The outer portion has an outer bifurcated end 72, and a vertically disposed pin 73 is mounted in this end.

A stop washer 76 is transversely mounted on the inner portion 71 of the rod 69 in endwardly spaced relation to the partition 54. A snap ring 77 is secured to the rod endwardly of the stop washer for preventing endward axial movement of the washer. A coiled compression spring 79 circumscribes the inner portion 71 of the rod 69 and has opposite ends bearing respectively against the partition and the stop member. The spring thus yieldably urges the stop member endwardly away from the partition.

An elongated flat, cutting blade 85 having a serrated cutting edge 86 and opposite ends has a slot 87 in one end fitted on the pin 67 and slot 88 in the other end fitted on the pin 73. The outer portion 70 of the rod 69 cannot rotate in the opening 53 so that the rods 65 and 69 mount the blade in substantially horizontal position therebetween and in adjacent spaced relation above the table 11.

An arcuate cake guide 95 is integrally outwardly extended from the housing 25 between the base studs 29 and has a horizontal slot 96 slidably receiving the blade 85. A cake guide 97 is secured by bolts 98 to the tubular portion 51 of the cantilever arm 48 and is arcuately extended therefrom toward the housing in substantially the same plane as the cake guide 95. The cake guide 97 has a horizontally disposed slot 99 slidably receiving the blade.

A substantially erect casing 105 is mounted within the housing 25 by means of a bracket 106 secured to the side wall 26, and upper and lower bearings 107 are fitted in the casing. A driven shaft 108 is rotatably mounted in the bearings 107 and has an upper threaded end on which is screw-threadably received an upper nut 109. A substantially circular flywheel 110 is concentrically screw-threadably received on the lower end of the driven shaft, and washers 111 are interposed the flywheel and the casing and the nut 109. The flywheel has a weighted segment 115 embracing substantially ninety degrees of the flywheel and being provided with a plurality of apertures 116. The apertures are bored in the segment in order to provide the exact weight desired. The flywheel also has a circumscribing V-shaped groove 117.

A slide 120 is slidably fitted on the blade-attaching rod 65 in the housing 25 and is adjustably fixed in position longitudinally thereof by a setscrew 121. The slide has a peg 122 upwardly extended therefrom. A pin 123 is eccentrically screw-threadably secured in the lower side of the flywheel 110 at a position substantially diametrically opposite to the center of mass of the weighted segment 115. A lever 124 has opposite ends pivotally connected to the peg 122 and to the eccentric pin 123.

An electric motor 130 having a power cord 131 and a drive shaft 132 is mounted in the housing 25, with the drive shaft downwardly extended, by means of a bracket 133 secured to the side wall 26 by bolts 134. A drive pulley 136 is secured to the drive shaft for rotation therewith and has a peripheral V-shaped groove 137. A V-shaped belt 138 is extended around the drive pulley and the flywheel 110 in the V-shaped grooves thereof so that upon energization of the motor, the flywheel is rotated.

For convenience in storing the slicing machine in suspended, out of the way position, an eyelet 140 having a screw-threaded shank 141 is mounted on the housing 25 by engagement of the shank in a screw-threaded bore 142 of the housing.

*Operation*

The operation of the described embodiment of the present invention is believed to be readily apparent and is briefly summarized at this point. The slicing machine 10 is easily carried by grasping the horizontal portion 49 of the cantilever arm 48. The machine is conveniently mounted on a table 11 by initially securing the base 12 to the table and by then fitting the studs 28 and 29 in the corresponding sockets 14 and 15 in the base. The housing 25, the arm 48, and blade 85 are held in position by the frictional engagement of the studs in the sockets. In this connection it is to be noted that it may be desirable to provide rubber grommets, not shown, in the sockets into which the studs are fitted thereby to increase frictional resistance to movement of the studs.

A cake 145 to be sliced is placed on the table 11 adjacent to the cutting edge 86 of the blade 85. The cord 131 is plugged into a suitable source of voltage, not shown, so as to energize the motor 130. This rotates the flywheel so as to impart longitudinally reciprocal or vibratory movement to the rods 65 and 69 and thus to the blade 85. It is to be noted that the blade moves between a neutral position and a position displaced from the neutral position. The spring 79 yieldably urges the blade into said neutral position to tension the blade in substantially horizontal cutting position at all times. The weighted flywheel 110 tends to smooth or to moderate fluctuations in the vibrations of the blade and rods as a result of the action of the spring.

The cake 145 is pushed into engagement with the vibrating cutting edge 86 and is moved transversely of the blade so as to permit passage of the blade through the cake. The cake is guided transversely of the blade by means of cake guides 95 and 97. The cake guides also prevent cake from getting between the rods 65 and 69 and the bore 43 or opening 53, respectively, thereby keeping the bearings clean. It will be evident that the cake is sliced into upper and lower layers 146 and 147 by the blade 85. The motor 130 and bearings 107 are cooled by air circulating upwardly through the opening 34 in the housing 25 and outwardly through the vents 36 in the cover 35.

It will be evident from the foregoing that a slicing machine has been provided which is portable, compact, safe to use, and which enables the slicing of cakes of uniform size and shape with a minimum of expense and time. In practice it has been found that a machine constructed in accordance with the above described principles has been excellently suited for its intended purposes.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In combination with a substantially horizontal support, a machine for slicing pastry articles slidable along the support comprising a base secured to the support; a hollow housing having a wall circumscribing an upright axis for the housing; means releasably mounting the housing on the base in fixed position and resisting rotation of the housing around said axis; a cantilever arm rigidly connected to the housing, outwardly extended in spaced relation above the support, and having an outer end spaced from the housing, the connection of the housing to the base holding the arm in substantially fixed position relative to the support; an elongated substantially flat cutting blade having opposite ends; mounting members connected to the opposite ends of the blade and respectively slidably mounted in the outer end of the arm and in the housing so as to enable longitudinal vibration of the blade in a substantially horizontal plane; tensioning means interconnecting the end of the arm and the mounting member in the end of the arm for yieldably resisting movement of the blade away from the end of the arm; means mounted in the housing having driving connection to the mounting member in the housing for imparting vibrating movement to the blade and for counterbalancing the tensioning means; and article guiding members individually secured to the housing and to the end of the arm in opposed relation to each other for guiding pastry articles during movement thereof transversely of the blade.

2. In combination with a substantially horizontal support; an apparatus for slicing a cake into stacked layers, which cake is slidable on the support, comprising a base rigidly secured to the support having upwardly disposed sockets arranged in triangular relationship so as to provide an apex socket and a pair of spaced base sockets; a housing; studs extended downwardly from the housing releasably frictionally fitted in the sockets of the base; a cantilever arm rigidly connected to the housing and extended outwardly above the support in a substantially vertical plane containing the apex socket and substantially equidistant between the base sockets having a hollow substantially horizontal tubular portion in spaced relation to the support and to the housing and providing an internal partition; a pair of axially aligned blade-attaching rods mounted for axial sliding movement in the housing and in the partition of the tubular portion, respectively, and lying in said vertical plane, one of said rods being held against rotation; a stop member mounted on the rod in the tubular portion in spaced relation to the partition; an elongated flat cutting blade interconnecting the rods and disposed in a substantially horizontal position; a coiled compression spring circumscribing the rod in said tubular portion interposed the partition therein and the stop member for tensioning the blade and for yieldably resisting movement of the blade away from the tubular portion; a substantially circular flywheel mounted in the housing for rotation on a substantially erect concentric axis; a lever having an end eccentrically pivotally connected to the flywheel and an opposite end pivotally connected to the rod mounted in the housing; and drive means having driving connection to the flywheel for rotation thereof to impart reciprocal movement to the blade to slice through a cake moved along the table in transverse engagement with the blade, the flywheel opposing and moderating fluctuations in the movement of the blade as a result of the action of the spring.

3. In combination with a substantially horizontal table; an apparatus for slicing a cake, having a peripheral edge, into a pair of stacked layers, which cake is slidable on the table, comprising a base rigidly secured to the table having three upwardly disposed sockets arranged in a substantially isosceles triangular relationship so as to provide an apex socket and a pair of spaced base sockets; a hollow housing having a vented top wall, an annular upstanding lateral wall, and a downwardly disposed opening; studs extended downwardly from the housing releasably frictionally fitted in the sockets of the base; a cantilever arm having an upper portion rigidly connected to the housing and substantially horizontally extended outwardly above the table, an end portion downwardly extended from the upper portion, and a hollow substantially horizontal tubular portion in adjacent spaced relation to the table, a transverse partition provided in the tubular portion transversally thereof, the cantilever arm being in a substantially vertical plane containing the apex socket and substantially equidistant between the base sockets; a pair of axially aligned blade-attaching rods mounted for axial sliding movement in the housing and through the partition of the tubular portion, respectively, and lying in said vertical plane, one of said rods being held against rotation; a stop member transversely secured on the rod in the tubular portion of the arm; an elongated flat cutting blade interconnecting the rods and disposed in a substantially horizontal position; a coiled compression spring circumscribing the rod in said tubular portion interposed the partition therein and the stop member for tensioning the blade and for yieldably resisting movement of the blade away from the tubular portion; an electric motor mounted in the housing having a downwardly extended drive shaft; a drive pulley mounted on the drive shaft for rotation therewith; a substantially vertical driven shaft rotatably mounted in the housing; a substantially circular flywheel concentrically mounted on the driven shaft for rotation therewith; a lever having an end eccentrically pivotally connected to the flywheel and an opposite end pivotally connected to the rod mounted in the housing; a pulley belt extended around the flywheel and the drive pulley for rotating the flywheel to impart reciprocal movement to the blade to slice through a cake moved along the table in transverse engagement with the blade, the flywheel having a weighted segment for opposing and moderating fluctuations in the movement of the blade as a result of the action of the spring; and a pair of arcuate cake guiding plates extended inwardly toward each other from the housing and the tubular member slidably receiving the blade and adapted to guide a cake longitudinally of the blade during passage of the blade through the cake.

4. A portable machine for slicing pastry articles slidable along a substantially horizontal support comprising a housing, blade receiving means rigidly mounted on the housing and outwardly extended therefrom, an elongated cutting blade, means mounting the blade in the housing and in the blade receiving means, respectively, for longitudinal vibratory movement relative to the blade toward and away from the housing, drive means mounted in the housing connected to the blade mounting means in the housing for imparting longitudinal vibratory movement to the blade, a base having a plurality of spaced sockets and adapted to be secured to the support with the sockets disposed away from the support, and a plurality of substantially parallel studs extended from the housing transversely of the blade in spaced relation circumferentially of the housing and individually releasably fitted in the sockets of the base for resisting forces imposed on the housing incident to vibratory movements of the blade and thereby resisting lateral movements of the blade and the housing relative to the support and the base.

5. A portable machine for slicing pastry articles slidable along a substantially horizontal support comprising a housing, a substantially circular flywheel mounted in the housing for rotation around a predetermined axis of rotation and including a weighted segment eccentric to said axis, means mounted in the housing having driving connection to the flywheel to impart rotation thereto, a cantilever arm rigidly outwardly extended from the wall of the housing transversely of said axis of rotation having an outer end spaced from the housing, an elongated cutting blade, means mounting the blade in the housing and in the outer end of the arm, respectively, in transverse relation to said axis of rotation for vibratory movement longitudinally of the blade, means connecting the blade mounting means to the flywheel eccentrically of said axis and on the opposite side of the axis from the weighted segment for vibrating the blade upon rotation of the flywheel, a base having a plurality of spaced sockets and adapted to be secured to the support with the sockets disposed away from the support, and a plurality of studs extended from the housing in spaced substantially parallel relation to said axis of rotation on generally opposite sides of the flywheel and individually fitted in the sockets of the base for resisting forces imposed on the housing incident to rotation of the flywheel and vibratory movements of the blade and thereby resisting lateral movements of the blade and the housing relative to the support and the base.

References Cited in the file of this patent
UNITED STATES PATENTS

| | | |
|---|---|---|
| 1,948,622 | Littlefield | Feb. 27, 1934 |
| 2,323,769 | Hansen | July 6, 1943 |
| 2,612,198 | Schlegel | Sept. 30, 1952 |